Figure 1:
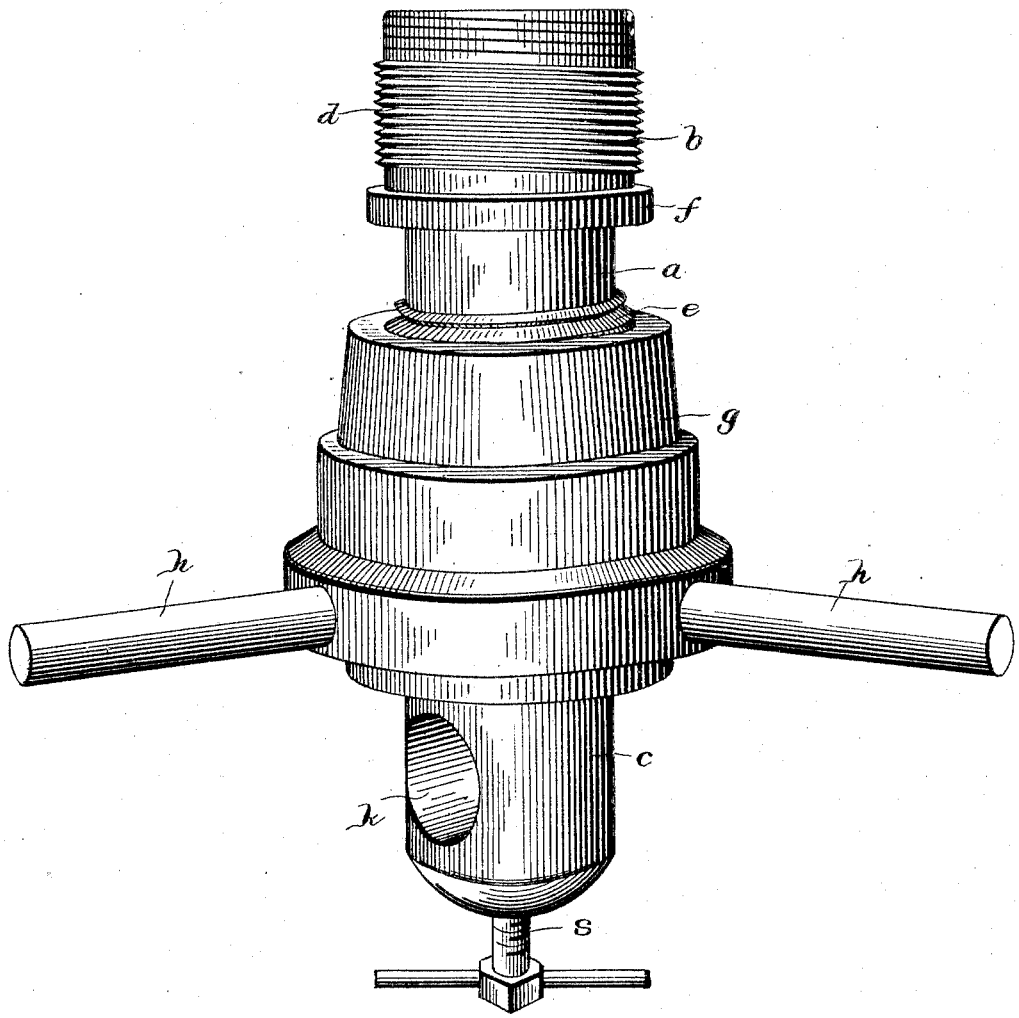

No. 777,446. PATENTED DEC. 13, 1904.
G. & J. STREHL.
WRENCH.
APPLICATION FILED MAR. 14, 1904.
NO MODEL. 2 SHEETS—SHEET 1.

Witnesses
R. A. Boswell.
Georg M. Anderson.

Inventors
Gustave Strehl,
John Strehl.
By E. W. Anderson
Their Attorney

No. 777,446. PATENTED DEC. 13, 1904.
G. & J. STREHL.
WRENCH.
APPLICATION FILED MAR. 14, 1904.
NO MODEL. 2 SHEETS—SHEET 2.
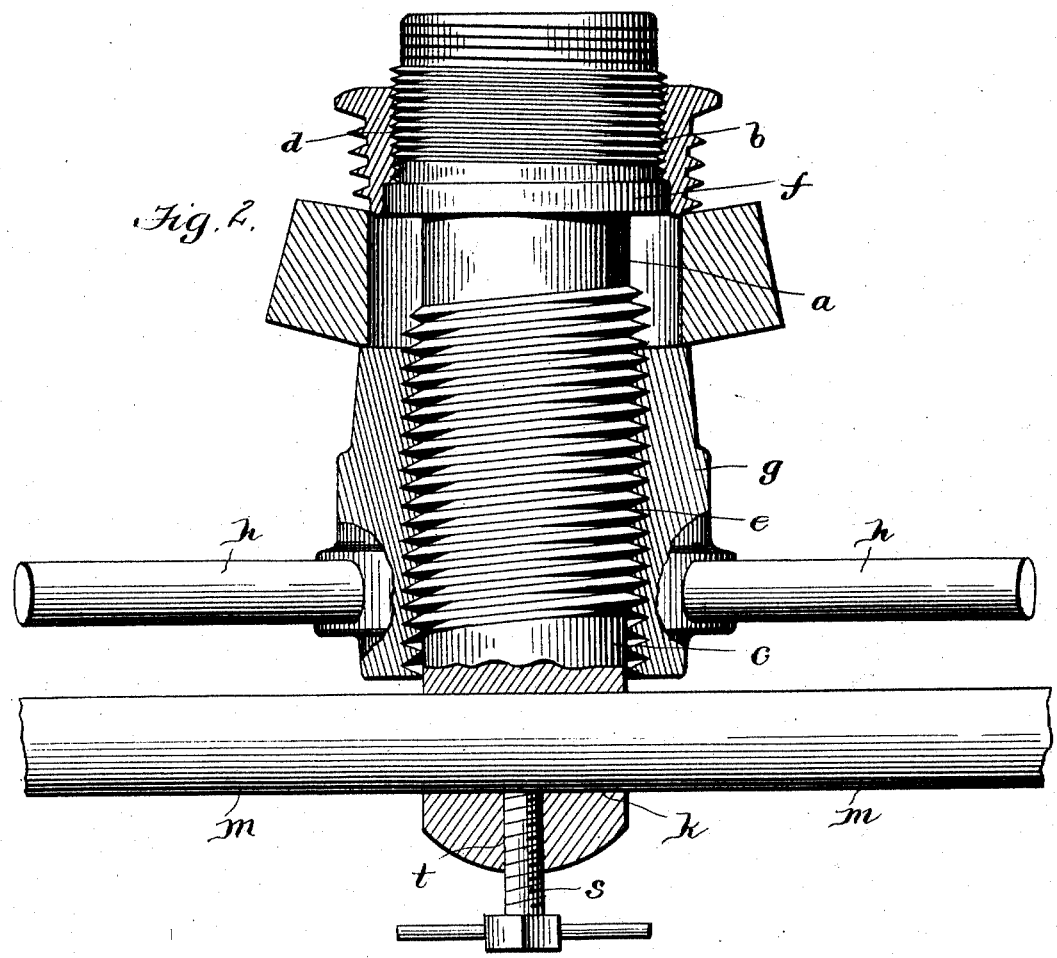
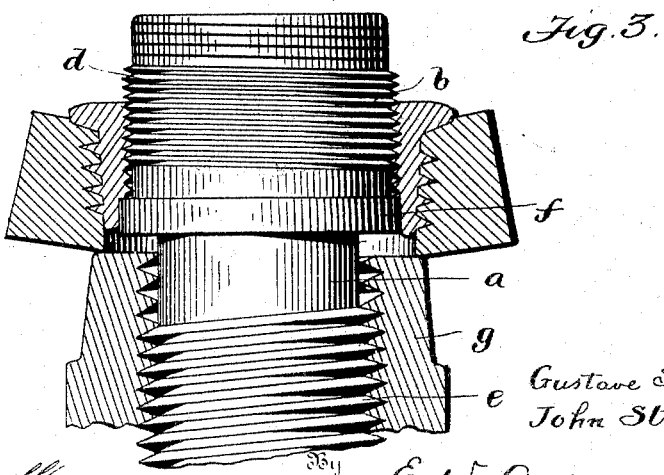

No. 777,446. Patented December 13, 1904.

UNITED STATES PATENT OFFICE.

GUSTAVE STREHL AND JOHN STREHL, OF LA CROSSE, WISCONSIN.

WRENCH.

SPECIFICATION forming part of Letters Patent No. 777,446, dated December 13, 1904.

Application filed March 14, 1904. Serial No. 198,089. (No model.)

*To all whom it may concern:*

Be it known that we, GUSTAVE STREHL and JOHN STREHL, citizens of the United States, and residents of La Crosse, in the county of La Crosse, State of Wisconsin, have made a certain new and useful Invention in Wrenches; and we declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a perspective view of the wrench. Fig. 2 is a sectional view of the same applied. Fig. 3 is a sectional view partly broken away.

The invention relates to devices for turning threaded bushings into their seats; and it consists in the novel construction and combinations of parts, as hereinafter set forth.

In the accompanying drawings, illustrating the invention, the letter $a$ designates a strong cylindrical body having an inner end $b$, an outer power end $c$, a finer thread $d$ on the inner end, and a coarser thread $e$ near the power end and of smaller diameter than the thread $d$, said threads being respectively left-hand and right-hand threads. A lock-flange $f$ is provided back of the thread $d$ on the body or shank and between the threads $d$ and $e$. This lock-flange $f$ also aids in centering the threaded portion $b$ for engagement with the bushing-thread by engagement with the bushing-seat in the keg. Engaging the coarser threaded portion is an abutment-nut $g$, having lever-arms $h$. The power end of the body or shank is usually provided with a transverse passage or bearing $k$ for a lever-bar $m$, and a small screw $s$ in a bearing $t$ in the end of the body or shank is designed to serve as a set-screw to hold the lever-bar in position when adjusted.

Bushings of the character which this wrench is designed to seat have on their outer surface a coarse screw-thread adapted to engage the wood of the barrel or keg, which is provided with a circular opening to receive the same. On its inside surface the bushing is provided with a finer thread to engage the thread of the inner bushing-lining, which is used in connection therewith to seat a plug or spigot. The bushing is designed to be forced into its seat from the inside of the keg outward and is held on the inside of the keg, while the bearing end of the shank is passed through the opening in the stave and the end $b$ engaged therewith. The nut $g$ is usually made slightly tapering at its inner portion, is of larger diameter than the lock-flange $f$, and when the inner end of the wrench has been engaged with the bushing this nut is turned quickly up against the inner marginal portion of the opening in the stave, engaging the same and forming an abutment stay or bearing. The lever is now turned and the nut becomes an abutment against the outer wall of the keg or barrel, and the inner end of the wrench-body being locked in engagement with the bushing the turning of the wrench forcibly turns the bushing into the circular opening of the stave, which it engages by its coarse outer thread. In this manner the bushing is easily secured in the stave-opening in a tight and secure manner.

Having described the invention, what we claim, and desire to secure by Letters Patent, is—

The bushing-wrench, consisting of the wrench-shank, having at its end a fine threaded portion of larger diameter than said shank, formed with a centering and lock flange at its back part, and, back of this flanged portion, a reversely-threaded portion, of smaller diameter, and coarser pitch, together with an abutment-bearing, of larger diameter than the lock-flange, engaging the reversely-threaded portion of the shank, and having lever-arms, substantially as specified.

In testimony whereof we affix our signatures in presence of two witnesses.

GUSTAVE STREHL.
JOHN STREHL.

Witnesses:
W. J. HICKISCH,
HUGO HICKISCH.